Nov. 11, 1924. 1,515,317

H. F. STARRETT

HOLE CLOSURE

Filed Dec. 30, 1920

Inventor:
Henry F. Starrett
By Jones, Addington, Ames & Seibold Attys.

Patented Nov. 11, 1924.

1,515,317

UNITED STATES PATENT OFFICE.

HENRY F. STARRETT, OF CHICAGO, ILLINOIS, ASSIGNOR TO STARRETT MFG. CO., OF CHICAGO, ILLINOIS, A CORPORATION OF ILLINOIS.

HOLE CLOSURE.

Application filed December 30, 1920. Serial No. 434,168.

*To all whom it may concern:*

Be it known that I, HENRY F. STARRETT, a citizen of the United States, residing at Chicago, in the county of Cook and State of Illinois, have invented new and useful Improvements in Hole Closures, of which the following is a full, clear, concise, and exact description, reference being had to the accompanying drawing, forming a part of this specification.

This invention relates to hole-closures, and more particularly to a combination applicable for this purpose whereby the opening in the panel-board cabinet adapted to receive the incoming feed conduit can be readily adjusted to conduits of different sizes.

The size of the incoming feed conduit, and possibly others with which a particular panel-board will be ultimately used, cannot be determined when the cabinet is being built and assembled in the factory. It is, consequently, advantageous to so arrange this opening that it can be varied by the party installing the cabinet for the particular size of conduit with which the cabinet is to be used. The change in the size of the opening should be speedily accomplished with a minimum of effort.

It is one of the objects of this invention, therefore, to provide means for the receiving of the incoming feed conduit which can be readily and quickly changed on the job during installation, so that it will fit conduits of different sizes.

Another object resides in the production of a device of this character whereby the hole in the cabinet is used for the conduit of maximum size and means whereby the size of this hole may be decreased to receive conduits of smaller size.

Other objects of the invention will become apparent from the following description, the accompanying illustration and the appended claims.

For the purposes of description, a preferred form of my invention is illustrated in the accompanying drawings, in which—

Figure 1:
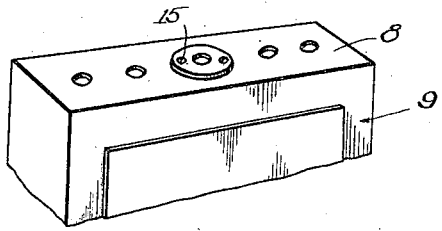
Fig. 1 is a view in perspective of the end of a panel-board cabinet with the hole-closure in position.

As illustrated in the drawings, the end wall 8 of the panel-board cabinet 9 is fitted with a hole or aperture 10, which aperture has a diameter of a size which will readily accommodate the conduit of maximum diameter which is to be used with the particular cabinet. Secured on the front face of the wall 8 is a knock-out plate 11 fitted with a knock-out portion 12, the knock-out portion having a diameter considerably smaller than the hole 10 in the cabinet wall. The diameter of the knock-out portion of the knock-out plate is substantially equal to the diameter of the smallest conduit which is to be used with the particular panel-board cabinet 9. Secured to the rear face of the cabinet wall 8 is a reducing plate or bushing 13 having a central opening 14 of a diameter intermediate between the diameter of the knock-out portion of the knock-out plate 12 and the hole 10 in the end cabinet wall 8. The knock-out plate 11 and the reducing plate 13 are secured to the end wall 8 in any suitable manner, preferably by bolts and nuts 15 and 16, respectively. If it is desired to provide openings for conduits of other sizes than those provided by the knock-out plate 11 and the reducing plate 13, other bushings having holes of different diameters can readily be mounted on the bolts 15 on the rear face of the cabinet wall 8. The bolts in this instance simply serve to store these various bushings, which can be selected as desired by the installer for the size of conduit which it is desired to use when the cabinet is being installed.

In the preferred form of my invention the knock-out portion of the knock-out plate 11 has a diameter of three quarters of an inch; the hole in the reducing plate has a diameter of one inch, and the hole in the end wall has a diameter of one inch and one quarter. The diameter of the conduits used with cabinets of this kind varies considerably, this variation extending from a quarter of an inch to three inches or more.

This invention obviously contemplates that the reducing plates used for the hole-closure be selected to cover the range ordinarily used for the incoming feed conduit of the particular capacity panel box enclosure. In making such selections, obviously a large variety of combinations of knock-out plates and reducing plates will be used, together with various sizes of holes in the end walls 8 of the panel-board cabinet enclosure.

Figures 2, 3:
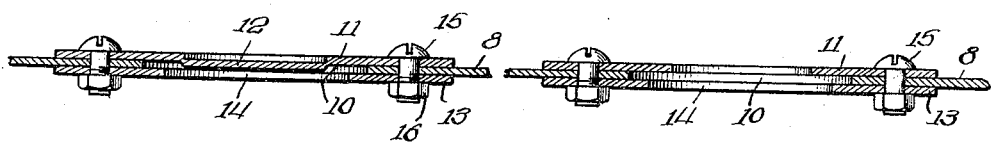
Fig. 2 is a transverse section through the end of the cabinet and shows the preferred manner of positioning the hole-closures on the cabinet wall.
Fig. 3 is a similar view with the knock-out portion of the knock-out plate secured to the front of the cabinet wall removed.
Figures 4, 5:
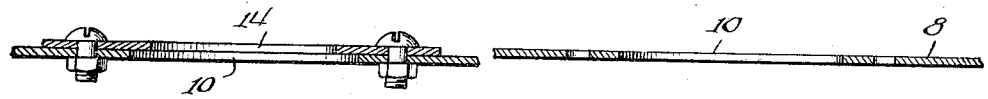
Fig. 4 is a similar view with the knock-out plate ordinarily secured to the front of the cabinet removed and the washer secured on the rear face of the cabinet wall shifted to the front face of said wall.
Fig. 5 is a similar view with both the knock-out plate and the washer removed.

In using the preferred form of the invention, as illustrated in the drawings, if the cabinet is to be used with a conduit of minimum diameter the knock-out portion 12 of the knock-out plate 11 is removed and the conduit is inserted through the opening left by the removal of the knock-out portion 12. The end wall of the cabinet with the knock-out portion 12 removed as used with a conduit having a diameter of minimum size is illustrated in Fig. 3. In the event that a conduit of somewhat larger diameter is to be used, the diameter of which is intermediate between the diameter of the knock-out portion 12 and the hole 10 in the end wall 8 of the cabinet, the bolts and nuts 15 and 16 are removed together with the knock-out plate 11 and reducing plate 13, after which the reducing plate 13 is positioned on the front of the cabinet, as illustrated in Fig. 4, and the bolts and nuts 15 and 16 replaced. The reducing plate when thus positioned, as illustrated in Fig. 4, restricts the opening in the end wall to the diameter of the armature 14 in the reducing plate 13.

When a conduit having the maximum diameter is to be used, both the knock-out plate 11 and the reducing plate 13 are permanently removed, as illustrated in Fig. 5, and the opening to receive the maximum size conduit is the hole 10 provided in the end wall 8 of said cabinet.

It will now be evident from the foregoing description that by the use of this invention the cabinet is adapted to receive conduits of varying diameters, which will substantially fit the hole or opening provided for the reception of such conduit, the diameter of this hole being varied by restricting the opening of the hole provided in the end wall by suitable placement or bushings or reducing plates having holes of varying diameters. These bushings are positioned on the end wall 8 of the cabinet by means of the bolts and nuts, as hereinbefore described. Each combination utilized for restricting the opening in the end wall of the cabinet contains one knock-out plate and either one or a plurality of bushings. The knock-out plate serves to close the opening in the event that the opening is not to be used for the reception of the conduit. If the opening is to be used to receive the conduit, the knock-out portion 12 of the knock-out plate is removed if a conduit of minimum size is utilized, and if conduits of larger sizes are to be used, the knock-out plate is thrown away and a reducing plate having an opening of a diameter substantially equal to the diameter of the conduit to be used is substituted in the place of the knock-out plate.

Obviously, this invention is not limited to the specific embodiment thereof herein illustrated and described, but this invention is capable of many variations and other applications within its spirit and scope, as set forth in the following claims.

Having thus described my invention, what I claim as new and desire to secure by Letters Patent, is:

1. In a device of the character described, the combination with a wall of a cabinet provided with a conduit hole, a knock-out plate having a knock-out portion of a diameter less than the diameter of the hole in said wall positioned in front of said hole, and a reducing plate having a hole of a diameter intermediate between said knock-out portion and said hole in said wall positioned in back of said hole in said wall, common means for removably securing said plates to said wall whereby the conduit hole may be adapted to any desired size of conduit by the removal of the required plate or plates.

2. In a device of the character described, the combination with the wall of a cabinet provided with a conduit hole of a size equal to the size of the conduit of maximum diameter to be used with the said cabinet, a knock-out plate having a knock-out portion of a diameter equal to the diameter of the conduit of minimum size to be used with the cabinet positioned in front of said hole, and a reducing plate having a hole of a diameter intermediate between said knock-out portion and said hole in said cabinet positioned in back of said wall, common means for removably securing said plates to said wall whereby the conduit hole may be adapted to any desired size of conduit by the removal of the required plate or plates.

3. In a device of the character described, the combination with the wall of a cabinet provided with a conduit hole of a size equal to the size of the conduit of maximum diameter to be used with the said cabinet, a knock-out plate having a knock-out portion of a diameter equal to the diameter of the conduit of minimum size to be used with the cabinet positioned in front of said hole, a reducing plate having a hole of a diameter intermediate between said knock-out portion and said hole in said cabinet positioned in back of said wall, and common means for removably securing said plates to said wall whereby the conduit hole may be adapted to any desired size of conduit by the removal of the required plate or plates.

4. In a device of the character described, the combination with the wall of a cabinet provided with a conduit hole of a size equal to the size of the maximum size conduit to be used with the cabinet, a knock-out plate having a knock-out portion of a diameter substantially equal in size to the diameter of the conduit of minimum size to be used with said cabinet, a reducing plate having a hole of a diameter intermediate between said hole in said wall and said knock-out plate, and common means for securing said plates to said wall whereby the conduit hole may be adapted to any desired size of conduit by the removal of the necessary plate or plates.

In witness whereof, I have hereunto subscribed my name.

HENRY F. STARRETT.